(12) United States Patent
Weber et al.

(10) Patent No.: US 11,237,413 B1
(45) Date of Patent: Feb. 1, 2022

(54) MULTI-FOCAL DISPLAY BASED ON POLARIZATION SWITCHES AND GEOMETRIC PHASE LENSES

(71) Applicant: Apple Inc., Cupertino, CA (US)

(72) Inventors: Andreas G. Weber, Los Altos, CA (US); Fletcher R. Rothkopf, Los Altos, CA (US); Tobias Eble, Sunnyvale, CA (US); Yury A. Petrov, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 16/558,473

(22) Filed: Sep. 3, 2019

Related U.S. Application Data

(60) Provisional application No. 62/729,023, filed on Sep. 10, 2018.

(51) Int. Cl.
  *G02F 1/01* (2006.01)
  *G06F 1/16* (2006.01)
  *G02B 27/01* (2006.01)

(52) U.S. Cl.
  CPC ....... *G02F 1/0136* (2013.01); *G02B 27/0172* (2013.01); *G06F 1/163* (2013.01); *G06F 1/1647* (2013.01)

(58) Field of Classification Search
  CPC .......... G02F 1/136; G06F 1/163; G06F 3/011; G02B 27/01-0176
  See application file for complete search history.

(56) References Cited

U.S. PATENT DOCUMENTS

| | | |
|---|---|---|
| 8,477,261 B2 | 7/2013 | Travis et al. |
| 2016/0277725 A1 | 9/2016 | Ellsworth et al. |
| 2016/0282639 A1* | 9/2016 | von und zu Liechtenstein ........... G01J 4/00 |
| 2018/0039052 A1 | 2/2018 | Khan et al. |
| 2018/0210222 A1 | 7/2018 | Seo et al. |
| 2018/0217377 A1* | 8/2018 | Lam .................... G02B 27/0179 |

FOREIGN PATENT DOCUMENTS

WO    WO 2018146326    8/2018

* cited by examiner

*Primary Examiner* — Laurence J Lee
(74) *Attorney, Agent, or Firm* — Thompson Hine LLP

(57) ABSTRACT

Some implementations disclosed herein include devices, systems, and methods that display images at multiple focus distances on HMDs. The systems can avoid or mitigate vergence-accommodation conflict (VAC) and depth-blur conflict (DBC) experienced by users on traditional HMDs. Some implementations use a geometric phase lens and a circular polarization switch. The geometric phase lens passively changes its power depending on the light's circular polarization. The circular polarization switch changes the polarization of the light at appropriate times. With the circular polarization switch and geometric phase lens positioned over an HMD screen, the system can quickly change the apparent distance to the screen, which in turn changes the accommodative state of the eye needed to focus on the rendered image.

20 Claims, 14 Drawing Sheets

| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | input pol. | right | right | right | right | right | right | right | right | left | left | left | left | left | left | left | left |
| 1. stage | λ/2 state (on: opposite, off: same) | on | on | on | on | off | off | off | off | on | on | on | on | off | off | off | off |
| 1. stage | λ/2 output circular pol | left | left | left | left | right | right | right | right | right | right | right | right | left | left | left | left |
| 1. stage | GPL state (on: r:+1.5D, l:−1.5D) | on | on | on | on | off | off | off | off | on | on | on | on | off | off | off | off |
| 1. stage | GPL power (D) | −1.5 | −1.5 | −1.5 | −1.5 | 0 | 0 | 0 | 0 | 1.5 | 1.5 | 1.5 | 1.5 | 0 | 0 | 0 | 0 |
| 2. stage | λ/2 state (on: opposite, off: same) | on | on | off | off | off | off | on | on | on | on | off | off | off | off | on | on |
| 2. stage | λ/2 output circular pol | right | right | left | left | right | right | left | left | left | left | right | right | left | left | right | right |
| 2. stage | GPL state (on: r:+0.5D, l:−0.5D) | on | off | on | off | on | off | on | off | on | off | on | off | on | off | on | off |
| 2. stage | GPL power (D) | 0.5 | 0 | −0.5 | 0 | 0.5 | 0 | −0.5 | 0 | −0.5 | 0 | 0.5 | 0 | −0.5 | 0 | 0.5 | 0 |
| total | system power (D) | −1 | −1.5 | −2 | −1.5 | 0.5 | 0 | −0.5 | 0 | 1 | 1.5 | 2 | 1.5 | −0.5 | 0 | 0.5 | 0 |

MULTI-FOCAL DISPLAY BASED ON POLARIZATION SWITCHES AND GEOMETRIC PHASE LENSES

CROSS-REFERENCE TO RELATED APPLICATION

This application claims the benefit of U.S. Provisional Application Ser. No. 62/729,023 filed Sep. 10, 2018, which is incorporated herein in its entirety.

TECHNICAL FIELD

The present disclosure generally relates to providing user experiences on head mounted devices (HMDs), and in particular, to systems, methods, and devices for rendering images on such devices.

BACKGROUND

Head mounted devices (HMDs) present images that are viewed by the eyes of users at relatively close range. Directly focusing on such close range images is undesirable or impossible for most users. To ease the burden on the users' eyes, HMDs typically present images that are warped or otherwise distorted and provide lenses that provide the users with undistorted views of those images. The lenses undistort the images presented on the displays for near eye viewing, e.g., bending the light from the displays that are relatively close to the users' eyes to make it easier for the users to focus on and see the images presented on the displays as if the users were looking at objects further away from the users' eyes, e.g., on a focal depth plane located significantly further away from the user's eyes. The users eyes are always accommodated to this single focal plane.

Many HMDs include screens that show slightly different images to each of the user's eyes. The difference in the images is used to create a strong illusion of depth in the scene. A significant issue with this approach is that while viewing different objects in the scene, the eyes change their convergence: from larger convergence for nearby objects to smaller convergence for far-away ones. Under natural viewing conditions these changes of convergence are accompanied by synchronized changes of the eyes' accommodative state necessary to bring objects in focus. This synchronized adjustment of convergence and accommodation is violated in an HMD, where the user's eyes need to be always accommodated to the same viewing distance set by the HMD's optics, e.g., to the single focal plane. A sensory conflict termed vergence-accommodation conflict (VAC) results. For strong VAC, humans experience a discomfort described as "eye-strain" and eventually fail to either focus the image (blurred vision) or fuse left and right eye images (double vision). Another, less severe, sensory conflict is due to all objects in the scene appearing sharp no matter what object is being looked at in HMD. This violates the natural viewing experience of the objects far out of the focus plane of the eyes appearing blurry, and creates a depth-blur conflict (DBC).

SUMMARY

Various implementations disclosed herein include devices, systems, and methods that display images at multiple focus distances on HMDs. The systems can avoid or mitigate VAC and DBC experienced by users on traditional HMDs. Some implementations use a geometric phase lens and a circular polarization switch. The geometric phase lens passively changes its power depending on the light's circular polarization. The circular polarization switch changes the polarization of the light at appropriate times. With the circular polarization switch and geometric phase lens positioned over an HMD screen, the system can quickly change the apparent distance to the screen, which in turn changes the accommodative state of the eye needed to focus on the rendered image.

Some implementations include a device that has a display, a circular polarization switch positioned on a side of the display (e.g., in front of the display), and a geometric phase lens positioned on a side of the circular polarization switch (e.g., in front of the switch). For example, the circular polarization switch and geometric phase lens may be positioned on or within an HMD between the display and an eye of the user. The display has light emitting portions configured to emit light. The circular polarization switch is configured to control a circular polarization of the light over time based on an applied voltage, for example, by applying different levels of AC voltage to two stacked Pi-cells oriented orthogonally. The geometric phase lens is configured to change power depending on the circular polarization of the light. For example, the geometric phase lens may be configured to passively change its power from positive to negative depending on the light's circular polarization. The change of lens power forces the user's eye to accommodate (e.g., change focus itself) as the user looks from near to far objects and vice versa, providing a more natural experience, for example, with less VAC.

In some implementations, a controller switches the power of the lens based on detecting particular conditions. This type of control is referred to herein as "variable focus" or "vari-focal." In a vari-focal system, the controller may detect a condition of the user's eye attributes or content being displayed and switch the lens power accordingly, forcing the user's eye to accommodate appropriately. As a specific example, the controller may switch lens power based on detecting gaze directions of the user's eyes, determining convergence based on the gaze directions, and estimating the nearness or farness of what the user is viewing based on the convergence. In another example, based on determining that all of the content being displayed is near or distant content in a particular frame, the system may determine to switch the power of the lens accordingly.

In some implementations, a controller alternatively switches the power of the lens, for example, switching after every frame, every two frames, etc. This type of control is referred to herein as "multiple focus time interleaved" or "multi-focal time interleaved." In a multi-focal time interleaved system the controller controls the circular polarization switch to alternate the power of the lens between multiple states in synchronization with images rendered by the display using alternating focal planes. As a specific example, the controller may obtain a sequence of images of a scene, render images of the sequence at alternating focal planes on a display, and synchronize a power of a lens to apply to light emitted from the display with the alternating of the focal planes. When the first (e.g., near) focal plane is used, the lens has a first power, when a second (e.g., far) focal plane is used, the lens has a second power, etc.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 15 is a block diagram illustrating a nine power states in accordance with some implementations.

Figure 1:
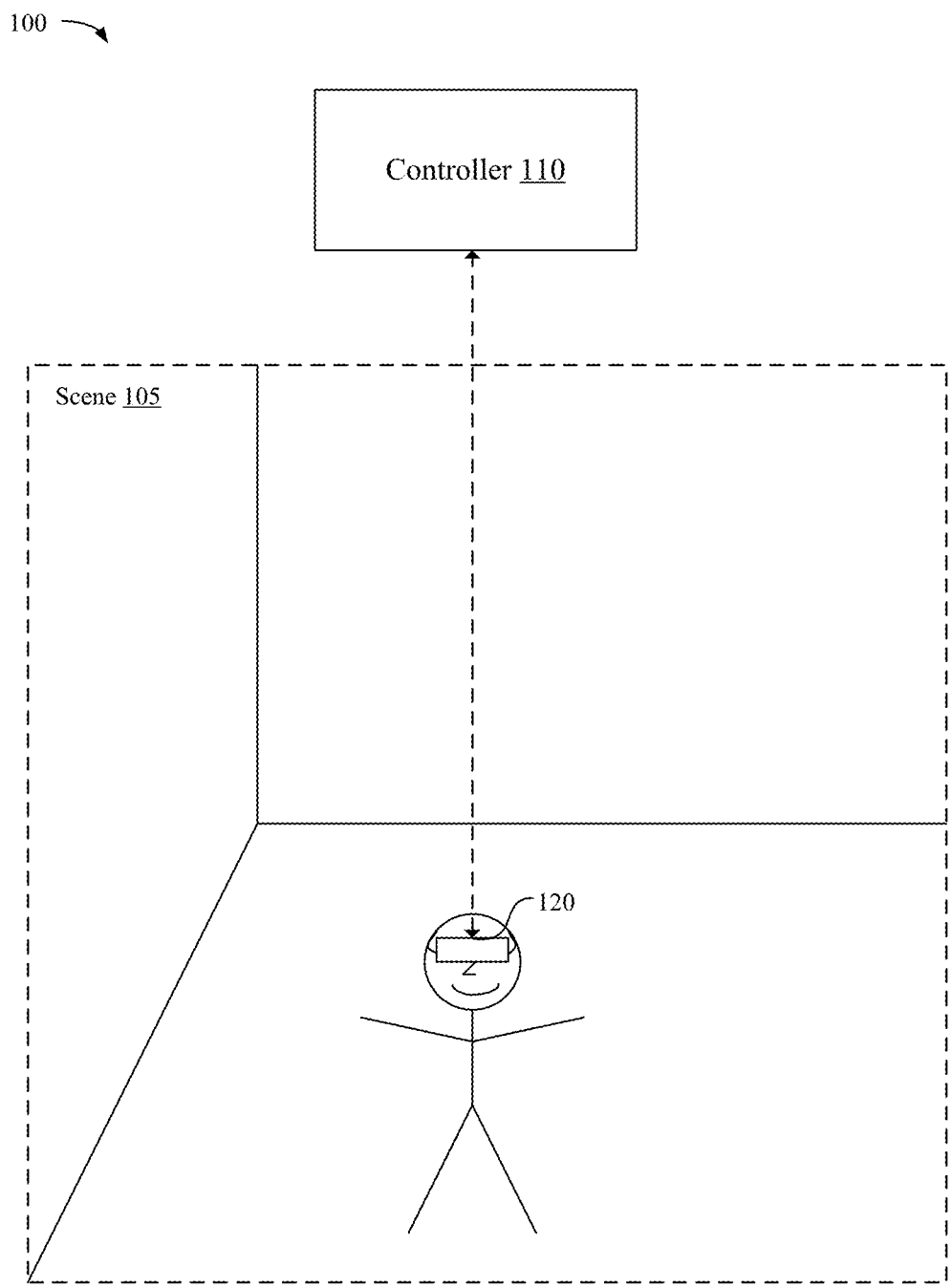
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide improved user experiences on HMDs. In some implementations, a system renders images at multiple focus distances for display in conjunction with the use of appropriately powered lenses. For example, an HMD may include a fast switching lens element that allows quickly alternating between two or more focus distances. The displayed images are configured to correspond to the alternating focus distances. This can provide a more natural user experience.

The techniques disclosed herein are not limited to two pre-determined focus distances. Any number of focus distances corresponding to different lens power states can be used, for example, by using additional switchable lenses or a variable (e.g., motorized) adjustable focus. In some implementations, a switchable lens has a global focal distance, changing the focus distance for the entire display area of the current image. In other implementations, a switchable lens has a local effect on focus distance, for example, changing the focus distance for only a pixel or group of pixels.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate a user experience for a user. In some implementations, the controller 110 includes a suitable combination of software, firmware, or hardware. The controller 110 is described in greater detail below with respect to FIG. 2. In some implementations, the controller 110 is a computing device that is local or remote relative to the scene 105. In one example, the controller 110 is a local server or other device located within the scene 105. In another example, the controller 110 is a remote server or other device located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the user experience to the user. In some implementations, the HMD 120 includes a suitable combination of software, firmware, or hardware. In some implementations, the user wears the HMD 120 on his/her head. As such, the HMD 120 includes one or more displays provided to display images. The HMD 120 may enclose the field-of-view of the user. The HMD 120 is described in greater detail below with respect to FIG. 3. In some implementations, the functionalities of the controller 110 are provided by or combined with the HMD 120, for example, into an HMD.

According to some implementations, the HMD 120 presents a computer generated reality (CGR) experience to the user while the user is virtually or physically present within the scene 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
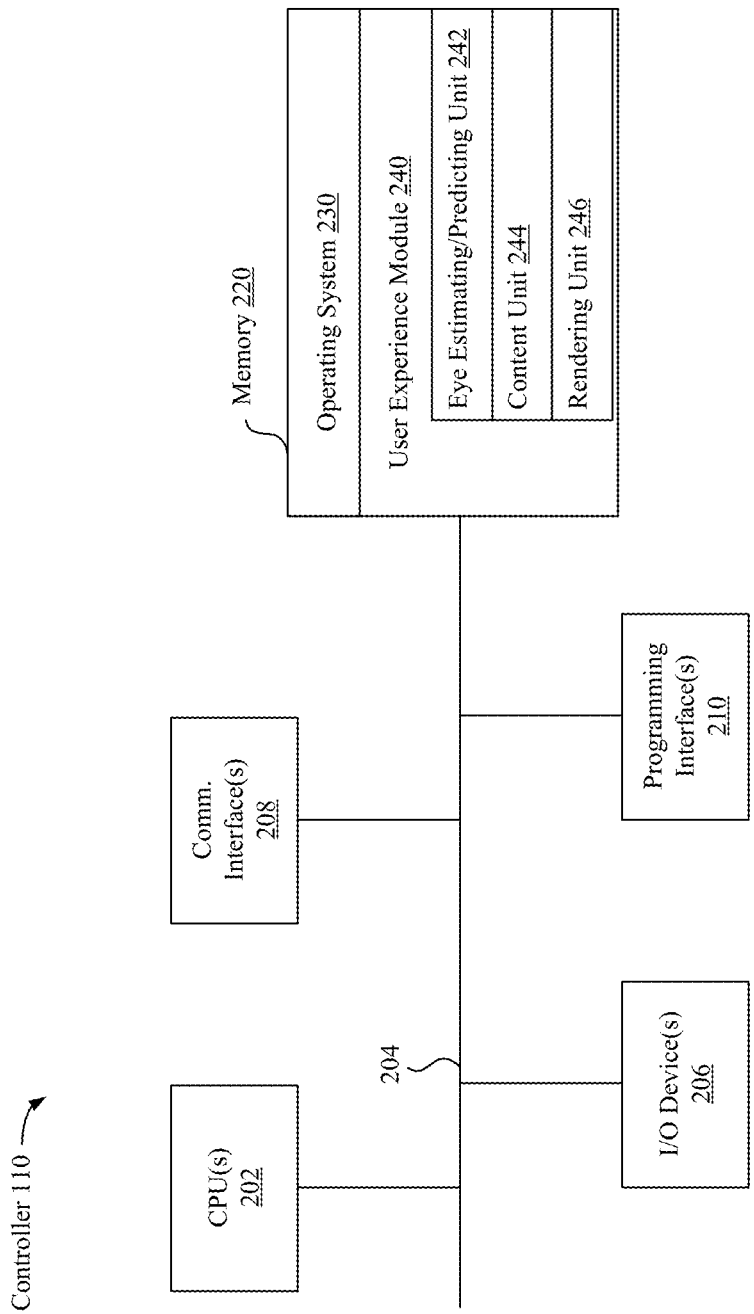
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a user experience module 240.

The operating system 230 includes procedures for handling various basic system services and for performing hardware dependent tasks. In some implementations, the user experience module 240 is configured to manage and coordinate one or more user experiences for one or more users (e.g., a single user experience for one or more users, or multiple user experiences for respective groups of one or more users). The user experience module 240 can be configured to facilitate rendering for multi-focus displays. To that end, in various implementations, the user experience module 240 includes an eye estimating/predicting unit 242, a content unit 244, and a rendering unit 246.

In some implementations, the eye estimating/predicting unit 242 is configured to obtain data (e.g., eye tracking data, interaction data, sensor data, location data, etc.) from at least the HMD 120 and to use that data to provide estimations or predictions of eye characteristics, (e.g., pupil location, gaze direction, eye convergence, eye focus state, etc.). To that end, in various implementations, the eye estimating/predicting unit 242 includes instructions or logic therefor, and heuristics and metadata therefor.

In some implementations, the content unit 244 is configured to obtain or create content (e.g., 2D or 3D models based on images or virtual content from other devices or sensors on the HMD 120 or other sources). To that end, in various implementations, the content unit 244 includes instructions or logic therefor, and heuristics and metadata therefor.

In some implementations, the rendering unit 246 is configured to obtain content from the content unit 244 to configure renderings based on the content (e.g., create 2D images of 3D models from particular viewpoints, lighting, and using other conditions or modify versions of 2D images) for display on the HMD 120. The rendering unit 246 may adjust the renderings/images based on the state of one or more lenses of the HMD 120 and other factors. In some implementations, the rendering unit 246 configures a sequence of images to have alternating focus distance characteristics corresponding to alternating lens states that will be used in displaying the images at the HMD 120. To that end, in various implementations, the rendering unit 246 includes instructions or logic therefor, and heuristics and metadata therefor.

Although the eye estimating/predicting unit 242, content unit 244, and rendering unit 246 are shown as residing on a single device (e.g., the controller 110), it should be understood that in other implementations, any combination of these units may be located in separate computing devices.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3:
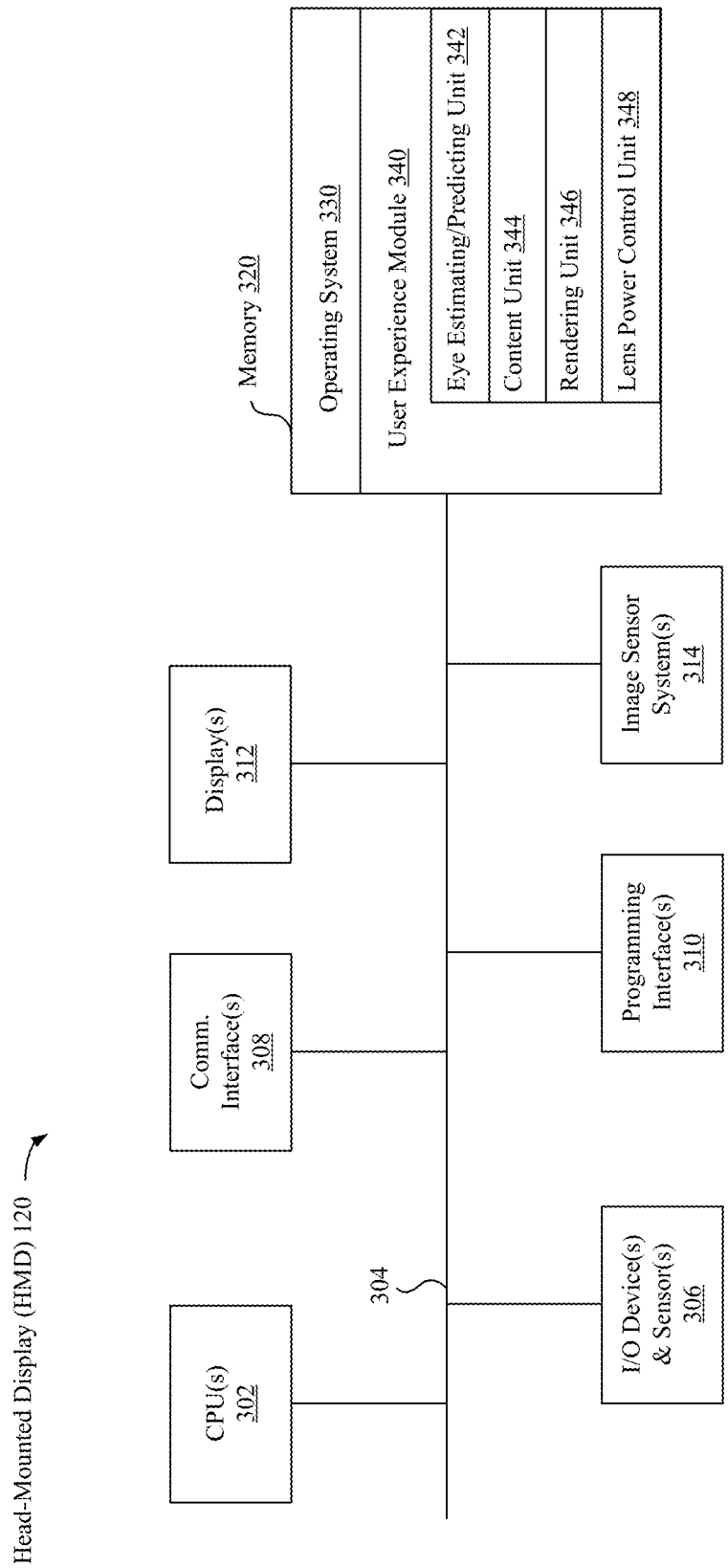
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a user experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), a retinal projection system, or the like display types. In some implementations, the one or more displays 312 correspond to diffractive, reflective, polarized, holographic, or waveguide displays. In one example, the HMD 120 includes a single display. In another example, the HMD 120 includes a display for each eye of the user. In some implementations, the one or more displays 312 are capable of presenting CGR content.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a user experience module 340.

The operating system 330 includes procedures for handling various basic system services and for performing hardware dependent tasks. In some implementations, the user experience module 340 is configured to present a user experience using a rendering unit configured for multi-focus display via the one or more displays 312. To that end, in various implementations, the user experience module 340 includes eye estimating/predicting unit 342, a content unit 344, a rendering unit 346, and a lens power control unit 348.

In some implementations, the eye estimating/predicting unit 342 is configured to obtain data (e.g., eye tracking data, interaction data, sensor data, location data, etc.) and to use that data to provide estimations or predictions of eye characteristics, e.g., pupil location, gaze direction, eye convergence, eye focus state, etc. To that end, in various implementations, the eye estimating/predicting unit 342 includes instructions or logic therefor, and heuristics and metadata therefor.

In some implementations, the content unit 344 is configured to obtain or create content (e.g., 2D or 3D models based on images or virtual content from other devices or sensors on the HMD 120 or other sources). To that end, in various implementations, the content tracking unit 344 includes instructions or logic therefor, and heuristics and metadata therefor.

In some implementations, the rendering unit 346 is configured to obtain content from the content unit 344 to configure renderings based on the content (e.g., to create 2D images of 3D models from particular viewpoints, lighting, and using other conditions or modify versions of 2D images) for display. The rendering unit 346 may adjust the renderings/images based on the state of one or more lenses of the HMD 120 and other factors. In some implementations, the rendering unit 346 configures a sequence of images to have alternating focus distance characteristics corresponding to alternating lens states that will be used in displaying the images at the HMD 120. To that end, in various implementations, the rendering unit 346 includes instructions or logic therefor, and heuristics and metadata therefor.

In some implementations, the lens power control unit 348 is configured to control the power of one or more lenses, for example, based on detected eye attributes (e.g., convergence), content, or time-interleaving. To that end, in various implementations, the lens power control unit 348 includes instructions or logic therefor, and heuristics and metadata therefor.

Although the eye estimating/predicting unit 342, content unit 344, rendering unit 346, and lens power control unit 348 are shown as residing on a single device (e.g., the HMD 120), it should be understood that in other implementations, any combination of these units may be located in separate computing devices.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
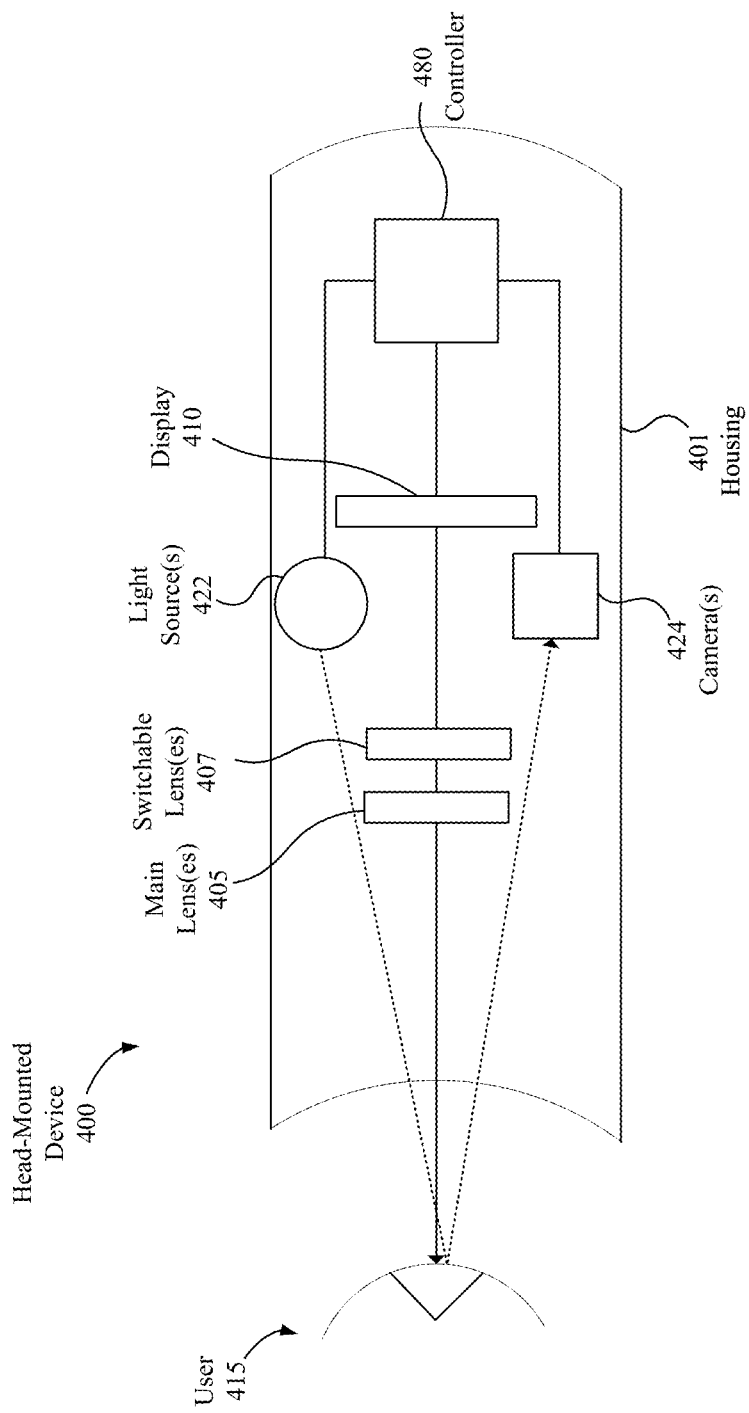
FIG. 4 is a block diagram of an example head-mounted device (HMD) in accordance with some implementations.

FIG. 4 illustrates a block diagram of another exemplary head-mounted device 400 in accordance with some implementations. The head-mounted device 400 includes a housing 401 (or enclosure) that houses various components of the head-mounted device 400. The housing 401 includes (or is coupled to) an eye pad (not shown) disposed at a proximal (to the user 415) end of the housing 401. In various implementations, the eye pad is a plastic or rubber piece that comfortably and snugly keeps the head-mounted device 400 in the proper position on the face of the user 415 (e.g., surrounding the eye of the user 415).

The housing 401 houses a display 410 that displays an image, emitting light towards or onto the eye of a user 415. In various implementations, the display 410 emits the light through an eyepiece having one or more main lens(es) 405 and one or more switchable lens(es) 407 that refract the light emitted by the display 410, making the display appear to the user 415 to be at a virtual distance farther than the actual distance from the eye to the display 410. For the user to be able to focus on the display 410, the virtual distance is at least greater than a minimum focal distance (e.g., 7 cm, 1 m, etc.). In some implementations, the focal distances switch between two or more such focal distances based on switching of the one or more switchable lenses 407. Examples of switchable lenses include, but are not limited to, combinations that use fast polarization switches to change the polarization state of the transmitted light and with that the optical power that is provided by the geometric phase lenses.

The housing 401 also houses a tracking system including one or more light sources 422, one or more cameras 424, and a controller 480. The one or more light sources 422 emit light onto the eye of the user 415 that reflects as a light pattern (e.g., a circle of glints) that can be detected by the camera 424. Based on the light pattern, images of the eye, or other information, the controller 480 can determine an eye tracking characteristic of the user 415. For example, the controller 480 can determine a gaze direction or a blinking state (e.g., eyes open or eyes closed) of the user 415. As another example, the controller 480 can determine a pupil center, a pupil size, or a point of regard. The gaze direction of both of the user's eyes can be determined using one or more tracking systems and used to determine a convergence angle. The focus state of the eye (e.g., which object the eye is focusing on, the state of the eye focus, etc.) can also be determined based on tracked eye characteristics. In various implementations, the light is emitted by the one or more light sources 422, reflects off the eye of the user 415, and is detected by the one or more cameras 424. In various implementations, the light from the eye of the user 415 is reflected off a hot mirror or passed through an eyepiece before reaching the camera 424.

The display 410 emits light in a first wavelength range and the one or more light sources 422 emit light in a second wavelength range. The one or more cameras 424 detect light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 415 selects an option on the display 410 by looking at it), provide foveated rendering (e.g., present a higher resolution in an area of the display 410 the user 415 is looking at and a lower resolution elsewhere on the display 410), or determine convergence of the eyes or otherwise estimate focus distance.

In various implementations, the one or more light sources 422 emit light towards the eye of the user which reflects in the form of a plurality of glints.

In various implementations, the camera 424 is a frame/shutter-based camera that, at a particular point in time or multiple points in time at a frame rate, generates an image of the eye of the user 415. Each image includes a matrix of pixel values corresponding to pixels of the image which correspond to locations of a matrix of light sensors of the camera.

In various implementations, the camera 424 is an event camera comprising a plurality of light sensors (e.g., a matrix of light sensors) at a plurality of respective locations that, in response to a particular light sensor detecting a change in intensity of light, generates an event message indicating a particular location of the particular light sensor.

Figure 5:
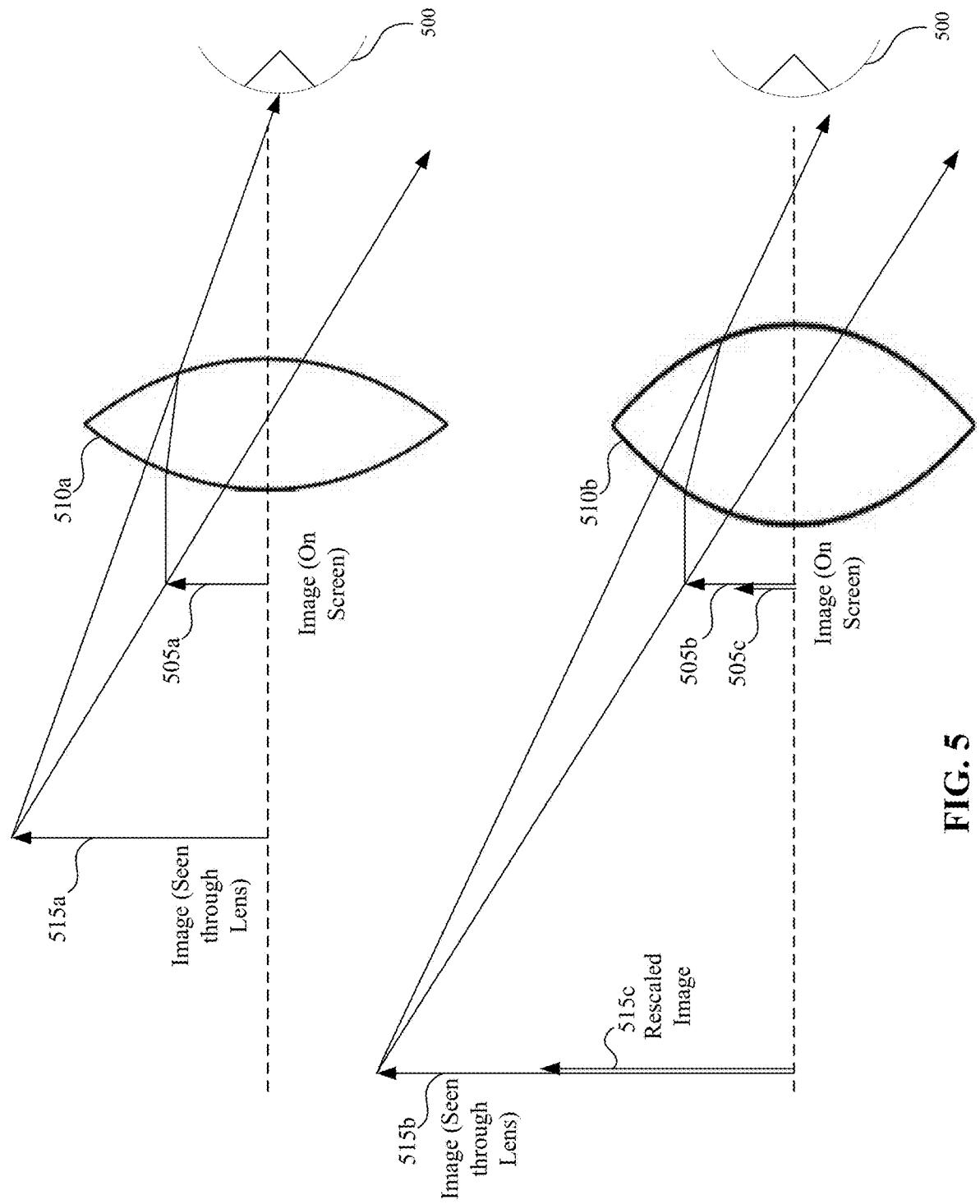
FIG. 5 is a block diagram illustrating how a human eye perceives an image in a lens-based system in accordance with some implementations.

FIG. 5 is a block diagram illustrating how a human eye 500 perceives an image in a lens-based system. In this example, given a relatively weaker lens 510a, the eye 500 perceives an image on a screen 505a as if the image were at a relatively close focal plane, e.g., as image 515a. In contrast, given a relatively stronger lens 510b, the eye 500 perceives an image on a screen 505b as if the image were at a relatively far focal plane, e.g., as image 515b. The image on the screen 505a can be rescaled as image 505c, so that on the rescaled image 515c at the more distant focal plane is the same size as the image 515a seen through the less powerful lens 510a at the closer focal plane. Thus, generally, a more powerful lens creates (virtual) images that appear larger and further away. By varying the lens' power, the system can make the image appear at various depths and the image size can be kept constant by rescaling the image on the screen.

Figure 6:
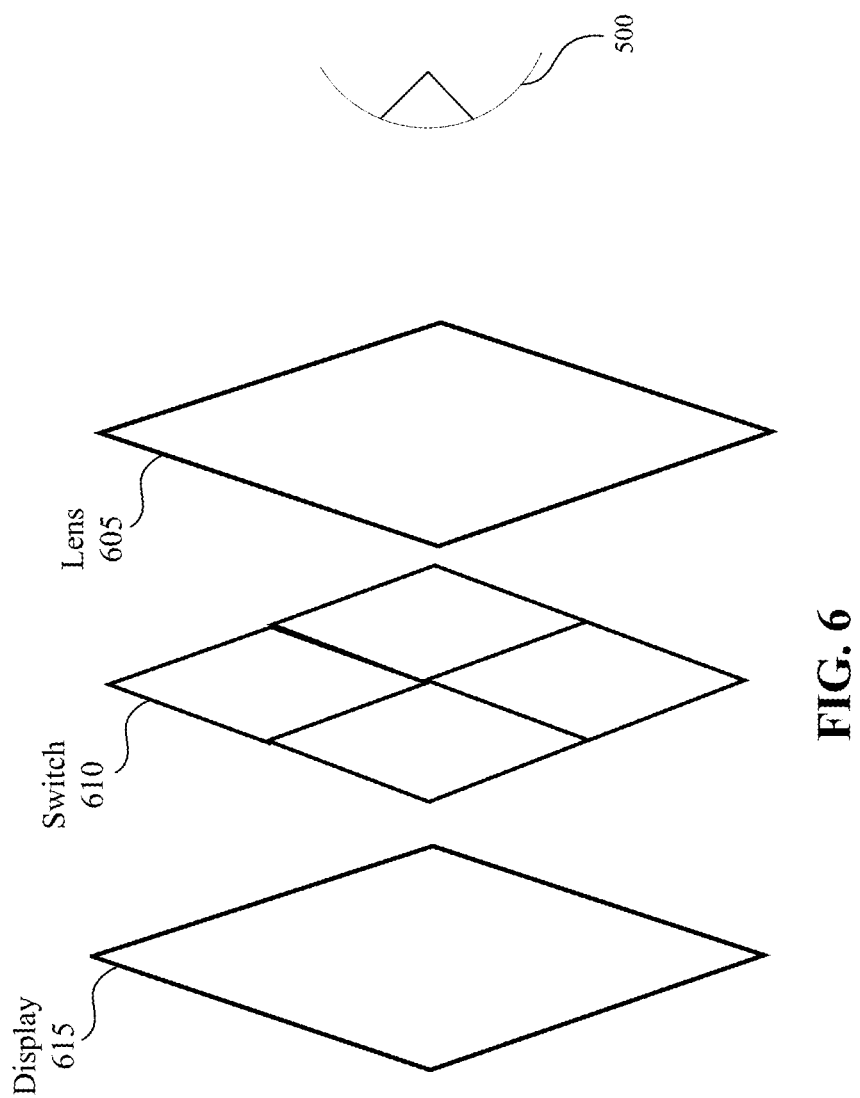
FIG. 6 is a block diagram illustrating positioning of a display, switch, and lens relative to an eye of a user in accordance with some implementations.

FIG. 6 is a block diagram illustrating positioning of a display 615, switch 610, and lens 605 relative to an eye 500 of a user in accordance with some implementations. In this example, the display 615 is a multi-color emissive display. The circular polarization switch 610 is a layer on top of the display 615 that controls the polarization state of the transmitted light by applying an electrical signal. The circular polarization switch 610 can have pixel, super pixel, or global resolution. The geometric phase lens 605 is a layer on top of the circular polarization switch 610 that has an optical power that depends on the polarization state of the transmitted light. The combination of the display 615, circular polarization switch 610, and geometric phase lens 605 (and possibly one or more other lenses not shown) creates a virtual image to the observer's eye 500. Changing the polarization state (e.g., globally, for pixel bocks, or for individual pixels) changes the distance of the virtual image or portion thereof.

Figure 14:
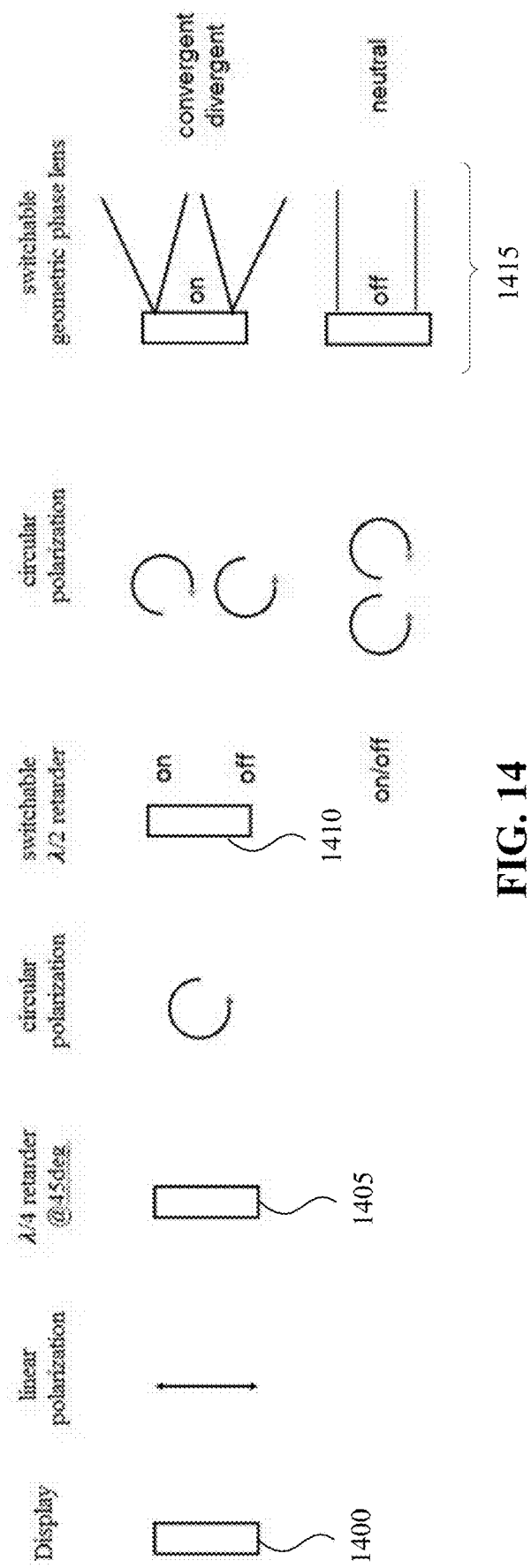
FIG. 14 is a block diagram illustrating three power states in accordance with some implementations.

In some implementations, a device such as an HMD includes the display 615, which includes one or more light emitting portions configured to emit light. The device includes the circular polarization switch 610 positioned on a side of the display 615. The circular polarization switch 610 is configured to control a circular polarization of the light over time based on an applied voltage. An exemplary circular polarization switch 610 works by applying two levels of AC voltage to two stacked Pi-cells oriented orthogonally. For example, the circular polarization switch 610 may be configured to provide a right hand polarization of the light in response to a first level of the applied voltage and a left hand polarization of the light in response to a second level of the applied voltage. In some implementations, the geometric phase lens is turned off to provide a third state, independent of the incoming polarization state. In that state the GPL does not provide any optical refractive power having parallel light, for example, as illustrated in FIG. 14.

The device includes the geometric phase lens 605 positioned on a side of the circular polarization switch 610 and providing different optical power depending on the circular polarization of the light. The geometric phase lens 605 provides optical power depending on the state of the light's circular polarization. The change of lens power forces the user's eye to accommodate (e.g., change focus itself) as the user looks from near to far objects and vice versa, providing a more natural experience, for example, with less vergence-accommodation conflict (VAC).

The circular polarization switch 610 and geometric phase lens 605 are positioned in the device and the device is positioned relative to a user such that a change of polarization by the circular polarization switch 610 changes a power of the geometric phase lens 605 on the light emitted from the display 615 and viewed by the user's eye 500. Changing the power of the geometric phase lens 605 on the light emitted from the display 615 can thus change an apparent/virtual distance of the display 615 from the eye 500, which requires the eye 500 to accommodate to focus on the image rendered by the display 615. The power of the geometric phase lens 610 on the light emitted from the display 615 can change an apparent depth from a first depth to a second depth. In alternative configurations more than two depths are provided. The change of power can correspond to different focal plane depths presented in images or parts of images. In some implementations, the change of power is based on a detected eye or content condition using a vari-focal technique. FIG. 15 describes a system with two stages of polarization switch and switchable geometric phase lens, providing a total of 9 different system optical powers corresponding to 9 different virtual image distances as a vari-focal technique. In some implementations, the change of power alternates based on a multi-focal time interleaved technique.

In some implementations, a configuration of multiple circular polarization switches, multiple lenses, or other components is provided to provide additional geometric phase lens-based power states.

Figure 7:
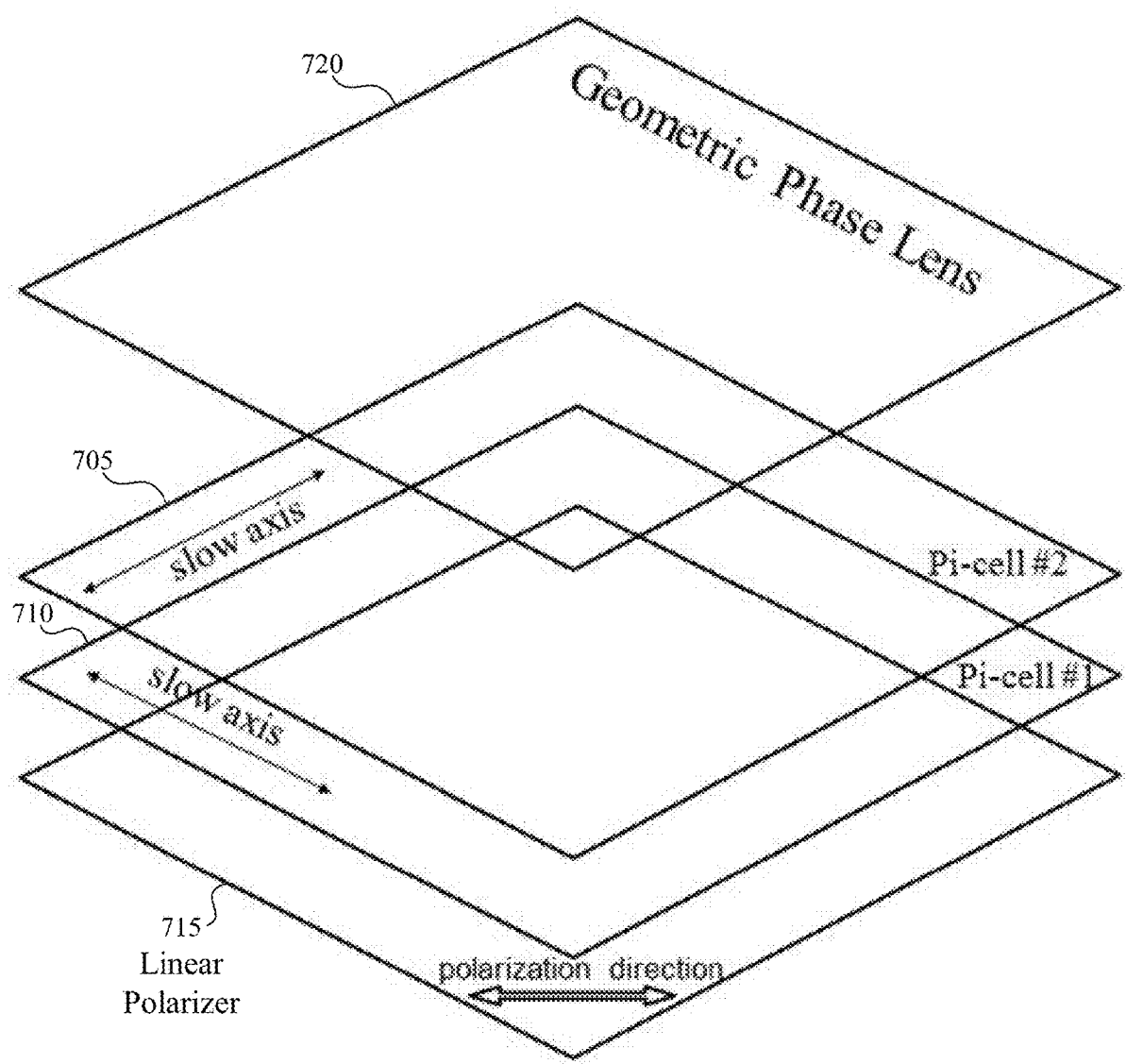
FIG. 7 is a block diagram illustrating an exemplary switch and lens configuration in accordance with some implementations.
Figure 8:
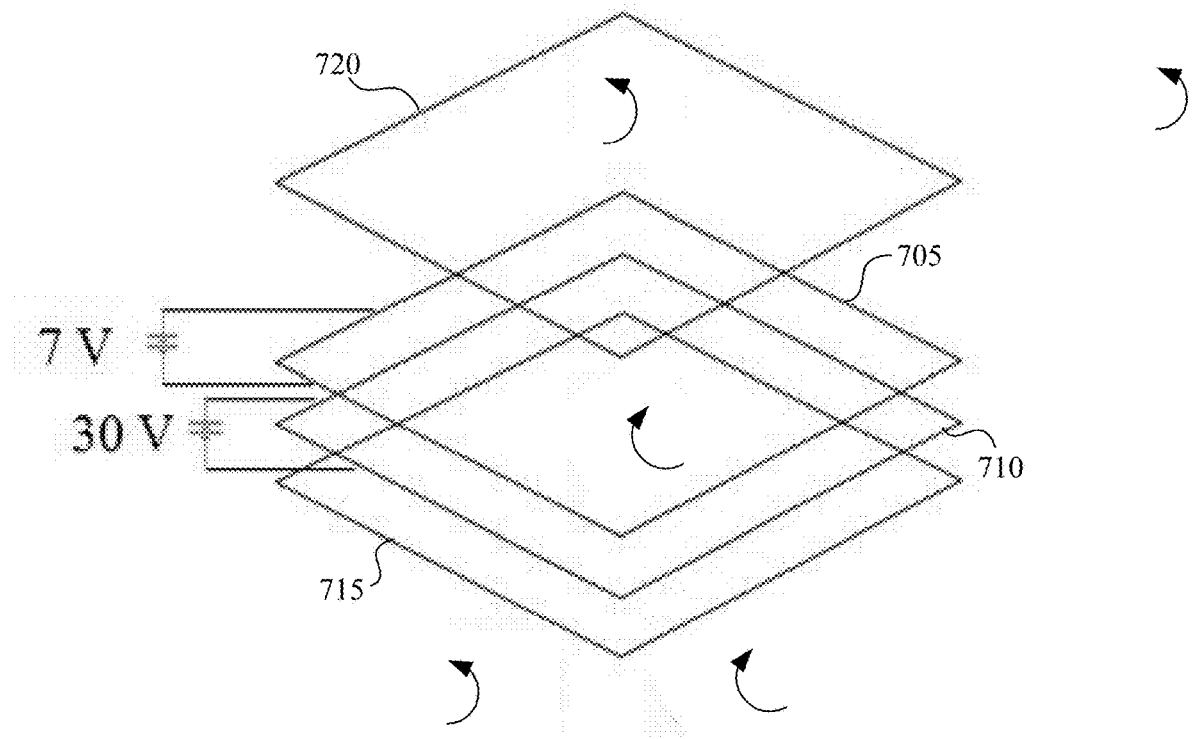
FIG. 8 is a block diagram illustrating a first state of the switch and lens configuration of FIG. 7 in accordance with some implementations.
Figure 9:
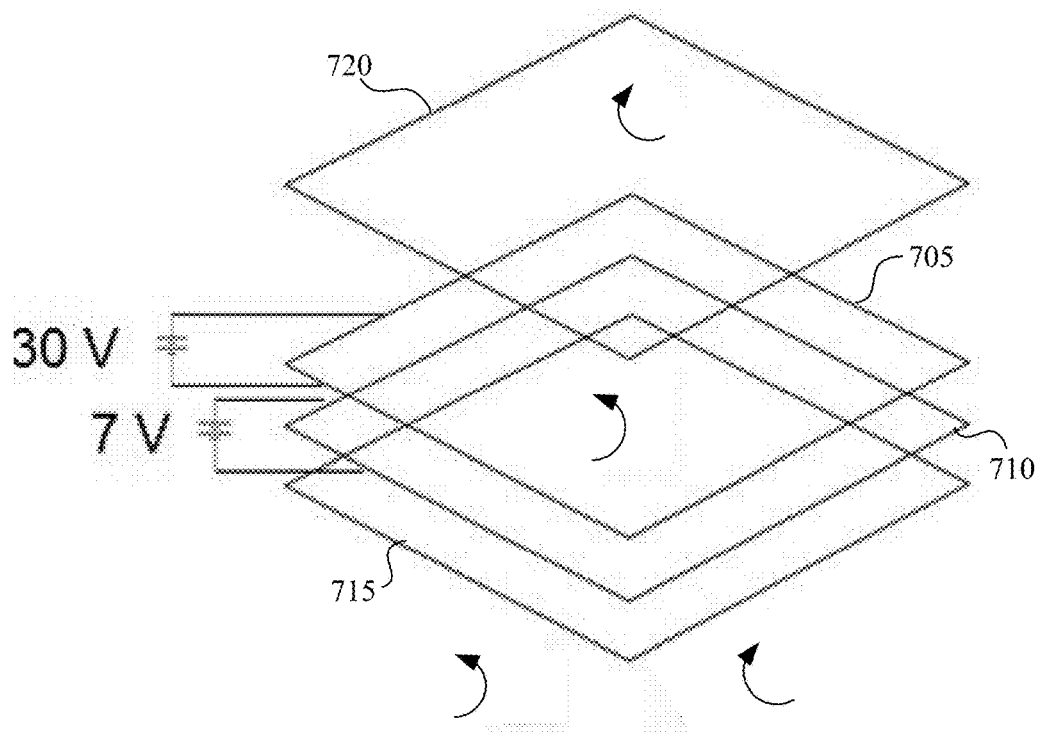
FIG. 9 is a block diagram illustrating a second state of the switch and lens configuration of FIG. 7 in accordance with some implementations.

FIG. 7 is a block diagram illustrating an exemplary switch and lens configuration in accordance with some implementations. In this example, the configuration includes two passive elements: a linear polarizer 715 and a geometric phase lens 720 and two active elements: Pi-cell #1 710 and Pi-cell #2 705. The linear polarizer 715 can be an optical filter that lets light waves of specific polarization pass through while blocking light waves of other polarizations. The linear polarizer 715 may convert a beam of light of undefined or mixed polarization into a beam of well-defined polarization. Pi-cell #1 710 and Pi-cell #2 705 are stacked and oriented orthogonally to one another. As illustrated in FIGS. 8 and 9, applying different voltages to Pi-cell #1 710 and Pi-cell #2 705 results in different circular polarization of light received at the geometric phase lens 720.

FIG. 8 is a block diagram illustrating a first state of the switch and lens configuration of FIG. 7. In this example, unpolarized light is filtered as it passes through linear polarizer 715. This polarized light then passes through Pi-cell #1 710 (to which a 30V voltage is applied) and Pi-cell #2 705 (to which a 7V voltage is applied). The light having passed through the Pi-cells 710, 705 has a right-hand circular polarization. The optical power of the geometric phase lens 720 depends on the circular polarization state handedness. Thus, given the right hand circular polarization of the light, the geometric phase lens 720 has a first optical power level.

FIG. 9 is a block diagram illustrating a second state of the switch and lens configuration of FIG. 7. In this example, unpolarized light is filtered as it passes through linear polarizer 715. This polarized light then passes through Pi-cell #1 710 (to which a 7V voltage is applied) and Pi-cell #2 705 (to which a 30V voltage is applied). The light having passed through the Pi-cells 710, 705 has a left-hand circular polarization. The optical power of the geometric phase lens 720 depends on this circular polarization. Thus, given the left hand circular polarization of the light, the geometric phase lens 720 has a second optical power level.

By switching the voltages applied to Pi-cell #1 710 and Pi-cell #2 705, the system can quickly change the effective polarization of the geometric phase lens 720 between the first optical power level and the second optical power level. Pi-cell #1 710 and Pi-cell #2 705 act as a fast circular polarization switch. The geometric phase lens 720 passively changes its power from positive to negative depending on the light's circular polarization handedness. By positioning the circular polarization switch and geometric phase lens 720 over the display screen, the system can quickly change the apparent distance to the screen in a binary fashion, which in turn changes the accommodative state of the eye needed to focus on the rendered image.

The circular polarization switch can include one or more modules. The individual circular polarization switch modules can be applied (i) locally above each pixel, (ii) locally above 'super-pixels' comprising a block of nearby pixels (e.g., 4×4 blocks), or (iii) globally above the whole screen to change the apparent depth of the whole screen.

Applying circular polarization switch modules locally, (i) or (ii), enables the system to respectively set a focal plane (e.g., and corresponding accommodative state of the eye) for single pixels or blocks of pixels. This can enable the creation of two (or more) image planes separated in depth into which the system can render in every video frame, e.g., in a given frame, some portions of the display render depictions of close up objects using a near plane, while other portions of the display render depictions of more distant objects using a far plane.

Figure 10:
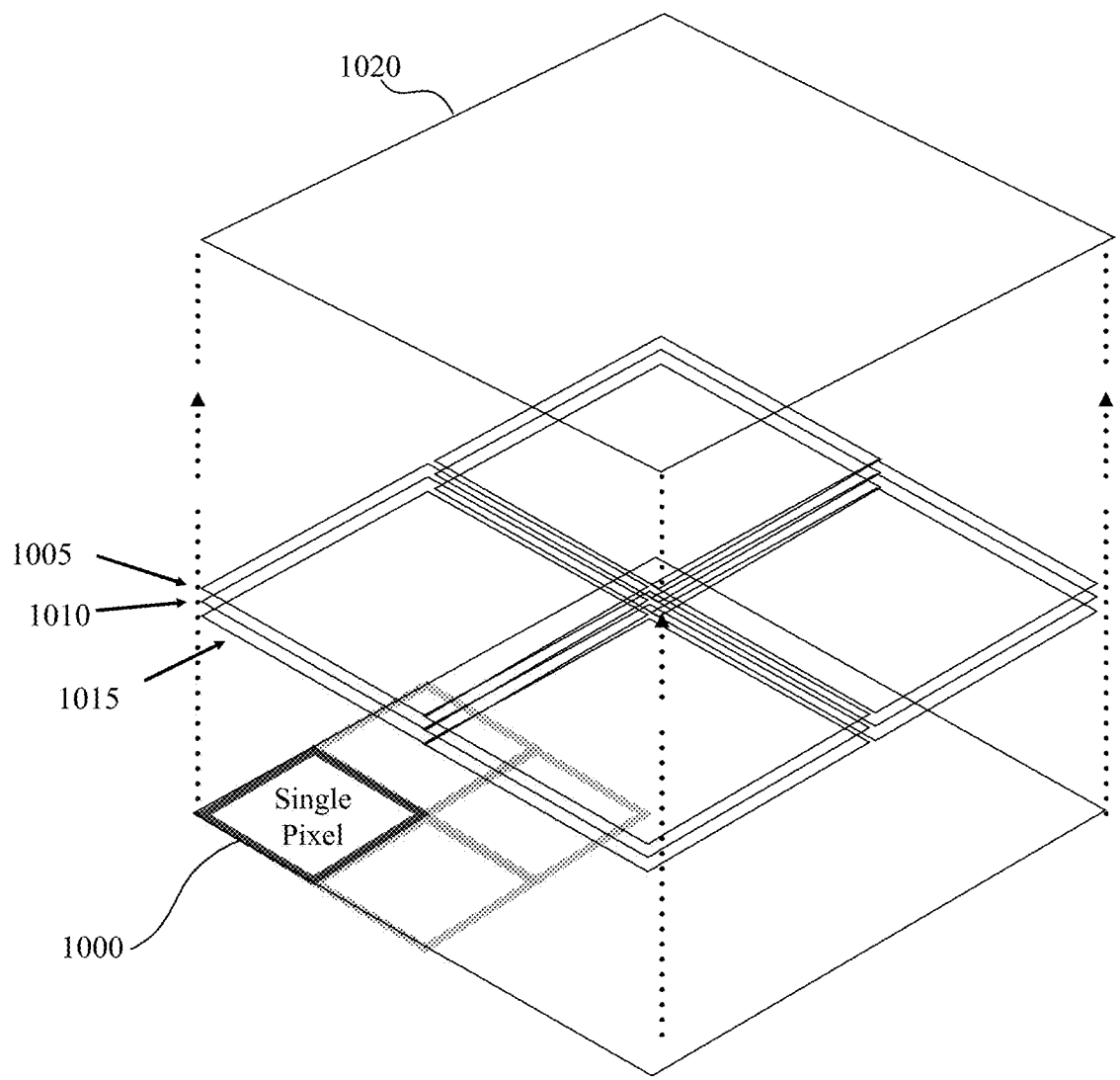
FIG. 10 is a block diagram illustrating a pixel-wise binary lens and 2 pixel by 2 pixel switch configuration in accordance with some implementations.

FIG. 10 is a block diagram illustrating a 2 pixel by 2 pixel switch configuration in accordance with some implementations. In this example, the configuration includes a display 1000 that includes pixels such as pixel 1000. The configuration also includes individual L/R circular polarization switches for super pixel blocks, e.g., for 2 pixel by 2 pixel blocks of the display. The linear polarizer 1015 can be an optical filter that lets light waves of specific polarization pass through while blocking light waves of other polarizations. The linear polarizer 1015 may convert a beam of light of undefined or mixed polarization into a beam of well-defined polarization. Each super-pixel block has a corresponding circular polarization module having two Pi-cells, such as Pi-cell #1 1010 and Pi-cell #2 1005, that are stacked and oriented orthogonally to one another. Different voltages can be applied to the different Pi-cells of the super-pixel blocks to selectively change the circular polarization for the various super-pixel blocks. Thus, at a given point in time, the circular polarization for one super-pixel block may be right hand while the circular polarization of another super-pixel block may be left hand. As a result, the geometric phase lens 1020 may provide different optical powers for different super-pixel blocks at any given point in time, selectively controlling the apparent depth of individual super-pixel blocks. A single, common geometric phase lens 1020 or multiple geometric phase lenses can be used for the super-pixel blocks.

Figure 11:
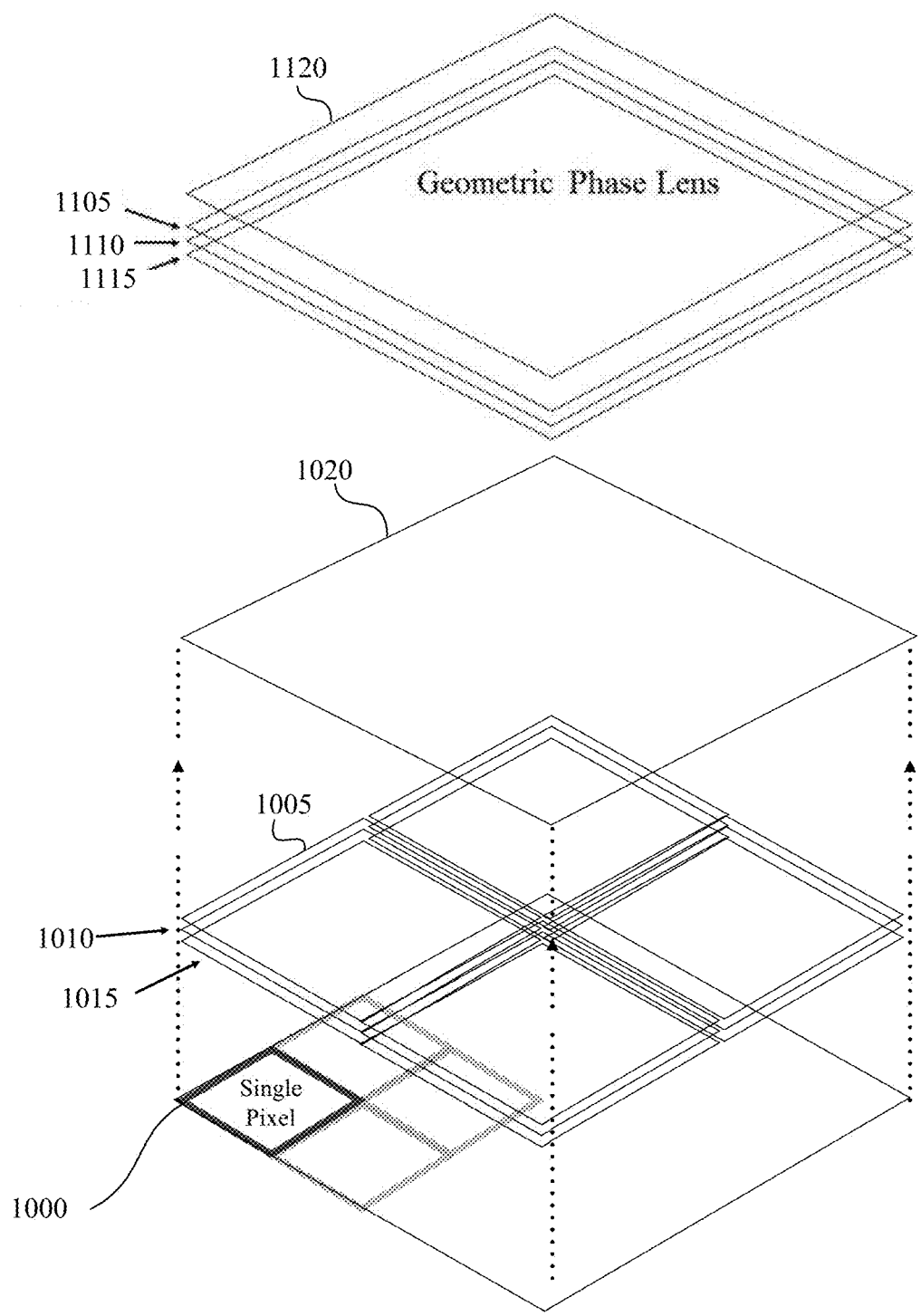
FIG. 11 is a block diagram illustrating a combination of a global binary depth switch with the 2 pixel by 2 pixel switch configuration of FIG. 10 in accordance with some implementations.

FIG. 11 is a block diagram illustrating a combination of a global binary depth switch with the 2 pixel by 2 pixel switch configuration of FIG. 10 in accordance with some implementations. In this example, a global circular polarization switch and geometric phase lens 1120 are used to shift the two image planes created by the configuration of FIG. 10 (e.g., by lens 1020, Pi-cell #2 1005, Pi-cell #1 1110, and linear polarizer 1115) back and forth in depth in alternating video frames. This hybrid local/global scheme effectively creates four image planes positioned at fixed distances from the user's eye. Two of the planes can be used for rendering simultaneously, while the other two planes can be used in the next rendering frame. For a screen refreshing at 120 Hz, this configuration creates four virtual screens refreshing at 60 Hz. For example, the system can create four virtual screens separated by ¾ D steps, e.g., at 33 cm, 44 cm, 66 cm, and 133 cm. This may allow a user's eyes to accommodate nearby objects differently from far-away objects in a natural fashion, resolving the VAC, and may also make objects rendered into depth planes other than the one currently focused appear with various degrees of natural blur, resolving the DBC.

In some implementations, multiple focal depth planes (e.g., 4 planes) are used, but the alternating images use only a subset of those planes during particular time segments. The subset for a given time segment may be based on the object or focal depth plane at which the user is currently looking. For example, if the user is looking at an object in the closest plane, the alternating planes may be only the closest plane and the second closest plane and the third and fourth planes may not be included in the alternation. At a later point during the user experience, the system may detect that the user is looking at an object in the farthest plane and switch to alternating images that focus on the third and fourth planes and the first and second planes may not be included in the alternating frames.

Technique for Associating Alternating Images with Different Focal Depth Planes

In some implementations, different depth planes can be assigned to images of a sequence of images. This can involve converting the first image of the sequence to a near focal depth plane image, converting the second image of the sequence to a far focal depth plane image, and converting the third image of the sequence to a near focal depth plane image, etc. The content of these alternating images can be changed based on the depth of objects in the images. In some implementations, the near focal depth plane images have only near content (e.g., far content is blocked via a depth-based mask) and far focal depth plane images have only far content. In other implementations, the images are adjusted in other ways to enhance the near content or deemphasize the far content in near focal depth plane images and enhance the far content or deemphasize the near content in far focal depth plane images. An image-plane specific version or versions of an image is created, in some implementations, by determining portions (e.g., pixels) of the image associated with each of multiple focal depth planes. For example, some pixels of the image may be assigned to foreground plane and some pixels may be assigned to a background plane. An adjusted image is then created by adjusting (e.g., reducing or boosting) the spatial high-frequency parts of the image. Specifically, the spatial high-frequency part of each portion may be adjusted based on which of the multiple focal depth planes is associated with the respective portion. Thus, for example, for a near focal depth plane version of the image, the high-frequency part may be boosted for near portions and reduced for far portions, while for a far focal depth plane version of the image, the high-frequency part may be reduced for near portions and boosted for far portions.

Various techniques may be applied to determine to which focal depth plane of multiple focal depth planes to assign each portion (e.g., pixel) of the image. Some implementations determine pixel focal depth plane assignments based on depths associated with different portions (e.g., pixels) of the image. Such techniques may involve obtaining and analyzing depth values, depth images, and depth histograms and may result in the creation of one or more masks that identify portions of the image associated with the different focal depth planes. In some implementations, depth data is obtained from sensors or 3D models of the content of an image. Some or all of the content of an image can be based on a real environment, for example, depicting the scene 105. Image sensors may capture images of the scene 105 for inclusion in the image and depth information about the scene 105 may be determined. In some implementations, a depth sensor determines depth values for pixels of images captured by an image sensor. The scene 105 around the user may be 3D modeled based on one or more values and subsequent depths of objects depicted in subsequent images of the scene can be determined based on the model and camera position information. Virtual objects in a CGR scene may have pre-assigned depth values or coordinates from which such depth values can be determined. In some implementations, depth data (e.g., associated with content of a scene or model) is directly analyzed to separate the image portions (e.g., pixels) into foreground and background. For example, a predetermined threshold or thresholds may be used to make such separations. In some implementations, the depth data is represented in a depth map that is used to separate the image portions into different focal depth planes.

The alternating focal plane images that are created are displayed in conjunction with a corresponding lens power being applied to a lens so that the user views each image appropriately. For example, a circular polarization switch can be used to change the circular polarization of light between images to control the power of a lens applied to light for each image of the images to correspond to the image depth plane of the corresponding image. For example, a first image may be pre-processed to facilitate viewing portions of the image within the foreground using a short distance focal depth plane, and a second image may be pre-processed to facilitate viewing portions of the image within the background using a more distant focal depth plane, etc. These images are presented in conjunction with the use of an appropriate powered lens. For example, the first image may be displayed while a lens power associated with the short distance plane is active, and the second image may be displayed while a lens power associated with the more distant plane is active, etc. If the frame rate of the alternating images is sufficiently fast, the user experience will include near objects that require the user's eye to focus on a close focal depth plane and far objects that require the user's eye to focus on the far focal depth plane. This may reduce VAC conflict by allowing the eye to change accommodation in relation to the virtual distance of an object.

Technique for Associating Image Portions with Different Focal Depth Planes

In some implementations, different depth planes are assigned to different portions of an image and pixel-specific or pixel block-specific lens power changes are implemented to correspond to the respective different portions of the image. Thus, if the image depicts a first object (e.g., a clock) at a depth of 3 feet and a second object (e.g., a car) at a depth of 20 feet, the pixels (or pixel blocks) associated with the first object can be assigned to a first focal depth plane while the pixels or pixel blocks of the associated with the second object can be assigned to a second focal depth plane. The image can be modified accordingly (e.g., warped, rescaled, etc.) and when displayed, the lens power for the different portions (e.g., pixels, pixel-blocks) are adjusted accordingly. Specifically, the pixels or pixel blocks of the first object are used with a lens power corresponding to the near focal depth plane while the pixels or pixel blocks of the second object are used with a lens power corresponding to the far focal depth plane.

Exemplary Vari-Focal Display Techniques

Figure 12:
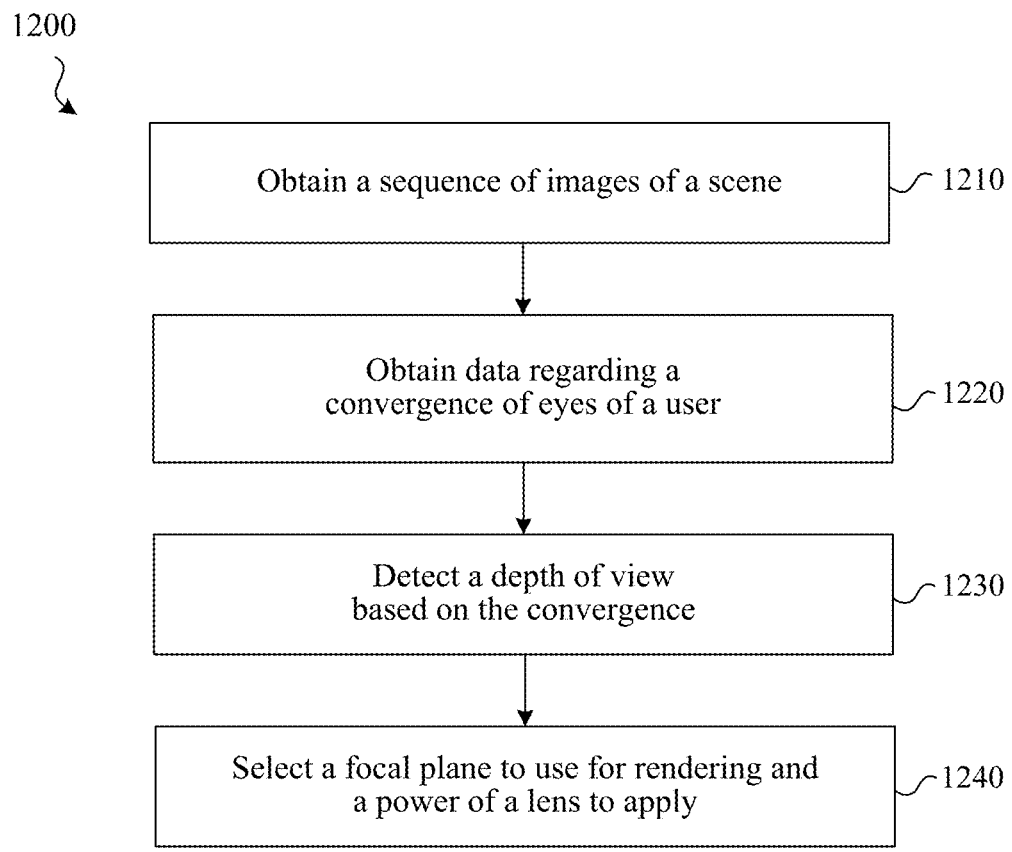
FIG. 12 is a flowchart representation of a method of vari-focal display in accordance with some implementations.

FIG. 12 is a flowchart representation of a method 1200 of vari-focal display in accordance with some implementations. In some implementations, the method 1200 is performed by a device (e.g., controller 110 of FIGS. 1 and 2), such as a mobile device, desktop, laptop, or server device). In these examples, the device and the HMD are separate devices and the device may wirelessly receive the images from the HMD or transmit the images to the HMD. In other implementations, the method 1200 is performed on a device (e.g., HMD 120 of FIGS. 1 and 3) that has one or more displays for displaying images and thus some or all of the features of method 1200 may be performed on the HMD itself. In some implementations, the method 1200 is performed by processing logic, including hardware, firmware, software, or a combination thereof. In some implementations, the method 1200 is performed by a processor executing code stored in a non-transitory computer-readable medium (e.g., a memory).

At block 1210, the method 1200 obtains a sequence of images of a scene. For example, the sequence of images of the scene may include images of CGR content to be rendered on a display at a frame rate (e.g., 120 fps). At block 1220, the method 1200 obtains data regarding a convergence of eyes of a user. The gaze direction of both of the user's eyes can be determined using one or more tracking systems and used to determine a convergence angle. For example, this can involve obtaining an image or images of the eyes via an image sensor or image sensors on the device and determining the convergence based on the image(s).

At block 1230, the method 1200 detects a depth of view based on the convergence. At block 1240, the method 1200 selects a focal plane to use for rendering the images on a display and a power of a lens to apply to light emitted from the display. These are selected based on the virtual object distance. Selecting the power of the lens can involve to change a polarization of the light emitted from the display to change a power of a geometric phase lens. For example, this can involve controlling a circular polarization switch to change power of the geometric phase lens on the light emitted from the display.

The method 1200 can further involve detecting a change of the virtual image distance based on a change of the convergence and, based on the change of the depth of view, selecting a second focal plane to use for rendering the images on a display and a second power of the geometric phase lens to apply to light emitted from the display. Changing the power of the geometric phase lens on the light emitted from the display can change an apparent distance of the display (e.g., its virtual distance) from an eye, which may requires the eye to accommodate to focus on an image rendered by the display. The depth can be changed from a first depth associated with a first focal depth plane to a second depth associated with a second focal depth plane and vice versa.

Exemplary Multi-Focal Time Interleaved Display Techniques

Figure 13:
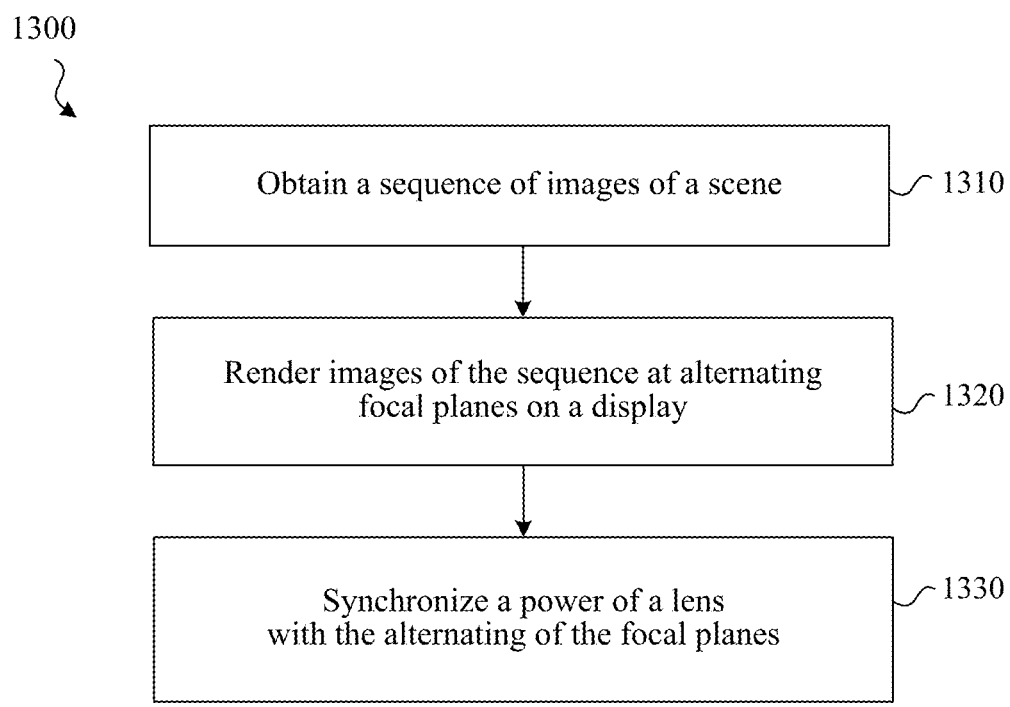
FIG. 13 is a flowchart representation of a method of multi-focal time interleaved display in accordance with some implementations.

FIG. 13 is a flowchart representation of a method 1300 of multi-focal time interleaved display in accordance with some implementations. In some implementations, the method 1300 is performed by a device (e.g., controller 110 of FIGS. 1 and 2), such as a mobile device, desktop, laptop, or server device). In these examples, the device and the HMD are separate devices and the device may wirelessly receive the images from the HMD or transmit the images to the HMD. In other implementations, the method 1300 is performed on a device (e.g., HMD 120 of FIGS. 1 and 3) that has one or more displays for displaying images and thus some or all of the features of method 1300 may be performed on the HMD itself. In some implementations, the method 1300 is performed by processing logic, including hardware, firmware, software, or a combination thereof. In some implementations, the method 1300 is performed by a processor executing code stored in a non-transitory computer-readable medium (e.g., a memory).

At block 1310, the method 1300 obtains a sequence of images of a scene. For example, the sequence of images of the scene may include images of CGR content to be rendered on a display at a frame rate (e.g., 120 fps). At block 1320, the method 1300 renders images of the sequence at alternating focal planes on the display. For example, the alternating images may alternate between images for a near focal plane and images for a far focal plane. In one example, give, a sequence of a first image, a second image, a third image, etc., the method 1300 renders the first image at a first focal depth plane, renders the second image at a second focal depth plane, renders the third image at the first focal depth plane, etc. Rendering the images, in some implementations, involves selectively altering particular portions (e.g., pixels) of the image for particular focal depth planes. For example, rendering the images can involve determining first portions of the images associated with a first focal depth plane and second portions of the images associated with a second focal depth plane and rendering the images by boosting or reducing the portions in a particular ways. For example, this can involve rendering a first set of the images at the first focal plane by boosting a characteristic (e.g., luma or a high frequency component) of the first portions and reducing the characteristic of the second portions and rendering a second set of the images at the first focal plane by reducing the characteristic of the first portions and reducing the characteristic of the second portions.

At block 1330, the method 1300 synchronizes a power of a lens with the alternating of the focal planes. Synchronizing the power of the lens can involve changing a polarization of light emitted from the display to change a power of a geometric phase lens. The polarization of the light can be changed using a circular polarization switch. Utilizing the different power states of the geometric phase lens based on the the polarization state of the light emitted from the display can change an apparent distance of the display from an eye, which may require the user's eye to accommodate to focus on an image rendered by the display.

Techniques for Multiple Lens Power States

FIG. 14 is a block diagram illustrating three power states. In this example, a combination of switchable retarder 1410 and switchable geometric phase lens 1415 creates three different optical powers. The switchable geometric phase lens 1415 can be switched on-off, thereby creating a third state, together with the two states of the circular polarization switch, e.g., of the Pi-cells. Specifically, light from display 1400 first undergoes linear polarization and then a circular polarization is applied at X/4 retarder 1405 at 45 degrees. This circularly polarized light then passes through switchable X/2 retarder 1410, wherein the light is polarized in one or the other polarization direction. The switchable geometric phase lens 1415 then provides one of three different optical powers based on which of the two polarization states the light has and based on the state of the switchable geometric phase lens.

FIG. 15 is chart 1500 illustrating a nine power states in accordance with some implementations. In this example, two stages of switchable half-wave plate (retarder) plus switchable geometric phase lenses are used to allow for nine different optical powers.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A device, comprising:
 a display comprising light emitting portions configured to emit light;

a circular polarization switch positioned on a side of the display and configured to control a circular polarization of the light over time based on an applied voltage;

a geometric phase lens positioned on a side of the circular polarization switch and configured to provide optical power depending on the circular polarization of the light; and a controller configured to control the circular polarization switch to change the optical power of the geometric phase lens amongst multiple states in synchronization with image content rendered by the display using multiple focal planes.

2. The device of claim 1, wherein the circular polarization switch comprises stacked pi-cells oriented orthogonally.

3. The device of claim 2, wherein the circular polarization switch is configured to apply two levels of alternating current (AC) voltage to the pi-cells.

4. The device of claim 1, wherein the circular polarization switch is configured to provide:

a right hand polarization of the light in response to a first level of the applied voltage; and a left hand polarization of the light in response to a second level of the applied voltage.

5. The device of claim 4, wherein the geometric phase lens is switchable to provide a third state, wherein the geometric phase lens is configured to be turned off to provide no optical power independent of incoming polarization.

6. The device of claim 1, wherein the circular polarization switch and geometric phase lens are positioned between the display and an eye, wherein the circular polarization switch and geometric phase lens are positioned such that a change of polarization by the circular polarization switch changes a power of the geometric phase lens on the light emitted from the display.

7. The device of claim 1, wherein the circular polarization switch comprises modules configured to be applied locally above each pixel of the display.

8. The device of claim 1, wherein the circular polarization switch comprises modules configured to be applied locally above blocks of pixels of the display.

9. The device of claim 1, wherein the circular polarization switch is adjacent to an entire display area of the display and configured to change an apparent depth of the entire display area of the display.

10. The device of claim 1, wherein the geometric phase lens is configured to passively change power based on the circular polarization of the light.

11. The device of claim 1, wherein changing power of the geometric phase lens on the light emitted from the display changes an apparent distance of the display from an eye, which requires the eye to accommodate to focus on an image rendered by the display.

12. The device of claim 1, wherein changing power of the geometric phase lens on the light emitted from the display changes an apparent depth from a first depth to a second depth.

13. The device of claim 1 further comprising a main lens configured to undistort images rendered by the display for near eye viewing.

14. The device of claim 1 wherein the controller is configured to switch the circular polarization switch based on detecting an eye condition of the user.

15. The device of claim 1 wherein the controller is configured to:

control the circular polarization switch and the geometric phase lens to alternate power of the lens between multiple states in synchronization with images rendered by the display using alternating focal planes; or control the circular polarization switch to change power of the lens for each image rendered by the display.

16. The device of claim 1, wherein the device is a head-mounted device (HMD) having a first display for a first eye and a second display for a second eye.

17. The device of claim 1 further comprising a second circular polarization switch and a second geometric phase lens.

18. The device of claim 1, wherein the device is configured to provide 4 or more different geometric phase lens-based power states.

19. A method comprising:

at a device comprising a processor, a display, a circular polarization switch and a geometric phase lens:

controlling the circular polarization switch to change the optical power of the geometric phase lens amongst multiple states in synchronization with image content rendered by the display using multiple focal planes.

20. A non-transitory computer-readable storage medium, storing program instructions computer-executable on a computer to perform operations comprising:

controlling a circular polarization switch to change the optical power of a geometric phase lens amongst multiple states in synchronization with image content rendered by a display using multiple focal planes.

* * * * *